Oct. 16, 1951  G. E. SELDON  2,571,625
THERMAL AND AUXILIARY VALVE COMBINATION
Filed Dec. 14, 1943
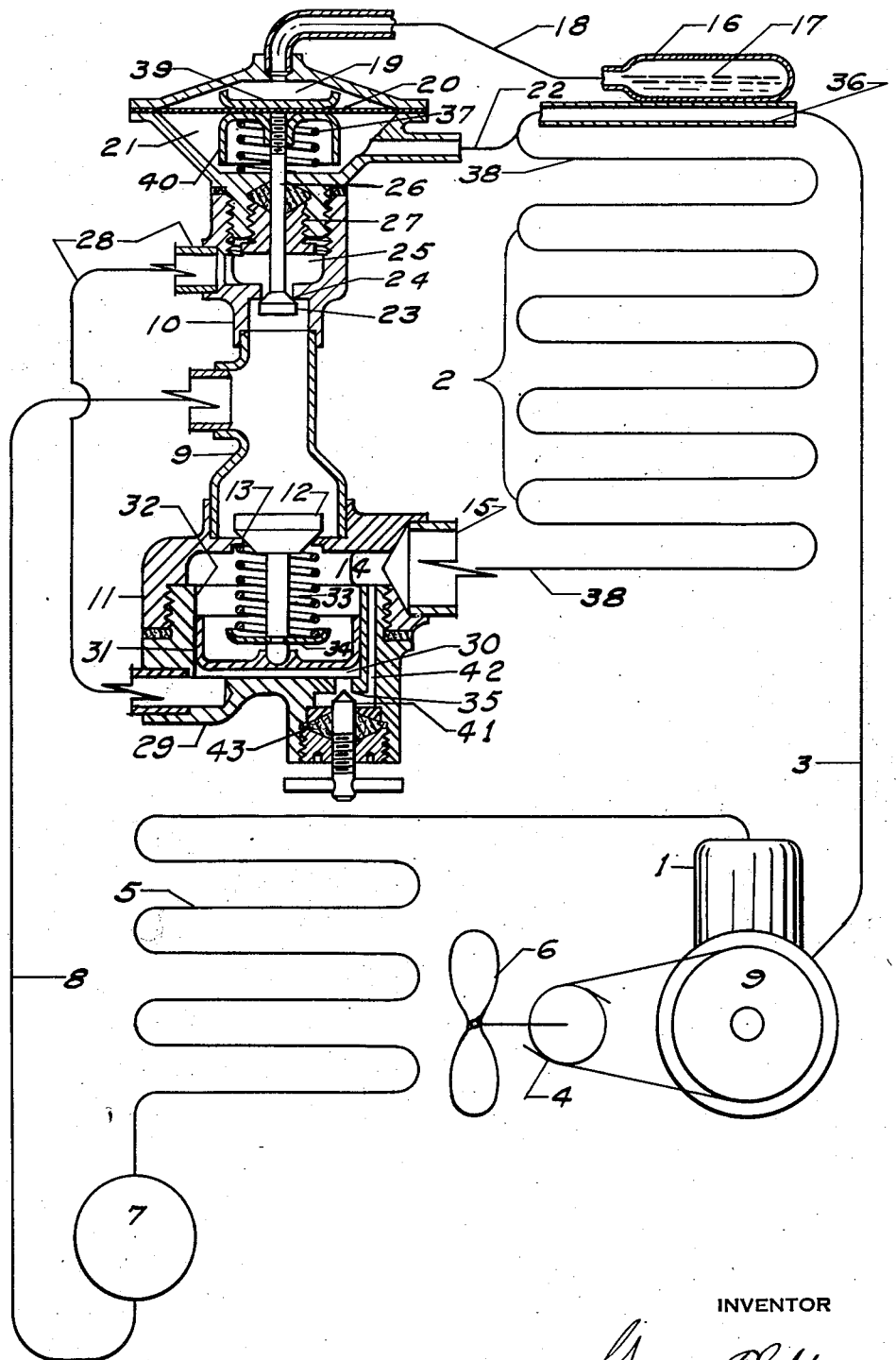
INVENTOR
George E. Seldon.

Patented Oct. 16, 1951

2,571,625

UNITED STATES PATENT OFFICE 2,571,625

THERMAL AND AUXILIARY VALVE COMBINATION

George E. Seldon, Kirkwood, Mo.

Application December 14, 1943, Serial No. 514,226

8 Claims. (Cl. 62—8)

1

This invention relates to thermostatically controlled expansion valves and more particularly to a combined main metering valve and a controlling pilot thermal valve.

Refrigeration systems using dry evaporators in which refrigerant flow therethrough is controlled by thermal valves are very efficient and have the most desirable operating characteristic of utilizing the entire evaporator surface for heat transfer. In such systems the evaporator temperature and internal pressure is a function of the rate of heat exchange and the capacity of the high side (compressor and condenser) to remove the vapor. Great care must be taken to prevent liquid slugs of any appreciable size from entering the rapidly rotating compressor since slugs beyond a very small minimum size invariably cause very serious damage to the compressor. Good thermal valves properly applied, effectively prevent the passage of liquid refrigerant slugs into the compressor.

Heretofore thermal valves have invariably used some form of resilient member such as a diaphragm or bellows to actuate the valve proper in response to evaporator pressures and temperatures. For optimum capacity a valve opening area as large as the seat itself is required and this takes a longitudinal movement of the valve of at least half the radius of the seat opening. That is, a valve operating on a seat of 1" in diameter must move at least ¼" off the seat before full discharge capacity of the valve and seat are reached. Since large capacity valves must have correspondingly large seats and valves, it follows that such valves should have long strokes. However expansion valve strokes have always been extremely short compared with the ideal since the length of the stroke is a function of diaphragm resilience. To provide the necessary resilience these diaphragm membranes are of necessity delicate and have very limited motion. Allowable motion or travel can be increased by increasing the diaphragm diameter but this strategy is largely offset by the increase in thickness and resulting stiffness made necessary by the increased load due to the increased exposed surface area. A movement of .060" to .080" has required 2½" diameter diaphragm to give it a life of adequate length in commercial applications. Even then failures are all too common. Large capacities are often attained by the use of a stroke too large for the diaphragm and which must then be stretched too near the breaking point. After a limited number of overstressed flexings the diaphragm breaks. This usually brings about the loss of all the refrigerant in the system as well as damage to the valve.

The object then of the present invention is to provide a valve combination having the functional characteristics of a single thermal valve yet having a metering valve with as much valve travel as may be desired, thereby increasing the capacity of the valve.

Another object is to provide a valve combination having normal thermal valve characteristics wherein the travel of the diaphragm-operated valve can be limited to its proper amount consistent with the other proportions of the diaphragm and at the same time providing large capacity due to its combination with a large metering valve having no diaphragm restriction.

It is a further object to provide a thermal valve combination that is extremely sensitive to slight differences of temperature between the boiling liquid refrigerant and the leaving vapors.

It is another object to provide a valve combination that is responsive to low superheats regardless of the wetness or the quality of the vapors within the evaporator, i. e. is not responsive to liquid and velocity head of liquid on the valve.

It is another object to provide the main metering valve of the combination with adjustment so that the relative travel of the two valves can be adjusted in a variety of ways to provide good operating characteristics.

Other objects and advantages will be apparent from the following description and accompanying drawing.

The figure is a cross sectional view of the valve located in a refrigeration system.

The drawing shows a compressor 1 withdrawing vaporized refrigerant out of the evaporator or boiler 2 through suction line 3. The compressor is driven by motor 4. The compressed vapor is condensed in condenser 5 which is cooled by a stream of air from fan 6.

The condensed liquid refrigerant is stored in receiver 7 and passes through the liquid line 8 and the T 9 to the pilot valve assembly 10. The main metering means or valve assembly 11 is here shown in section having a valve 12 co-operating with seat 13 to control the flow of liquid refrigerant from the T 9 into the chamber 14 and out through discharge pipe 15 to the evaporator 2. Here the liquid refrigerant vaporizes since the compressor maintains the pressure in the evaporator below that pressure of the refrigerant corresponding to the temperature of the surrounding medium or the evaporator walls, and of course less than in the liquid line. On passing through the evaporator or boiler 2, the liquid refrigerant is continually boiling off into vapor or vaporizing. As long as any liquid refrigerant remains, the temperature of the evaporator or more precisely the boiling liquid is that which corresponds to the boiling point of the refrigerant at the pressure existing at that point in the evaporator and the point at which the temperature is being considered. It is well to note here that the pressure throughout an evaporator is not necessarily the same or uniform due to differences of hydraulic head and state of refrigerant fluid. At the last turn of the evaporator however the liquid refrigerant should all be vaporized. On passing through the last section of tubes or tube and leaving the evaporator, the vapor absorbs additional heat which raises its temperature above the boiling point temperature; that is, it acquires some superheat. On this last turn or outlet pipe 36 is mounted a bulb 16 containing a quantity of volatile fluid 17. This fluid is usually the same as the refrigerant used in the system; at least it should have quite similar vapor-pressure characteristics. The bulb is placed in intimate contact with this coil or pipe so as to have the same temperature as the leaving vapors of the refrigerant. The vapor pressure then of the bulb fluid 17 is a function of the temperature of the superheated vapors being drawn out of the evaporator by the compressor. This bulb fluid pressure is carried through tube 18 to chamber 19 where it reacts on the diaphragm 20, tending to open valve 23. This opening force increases with a rise in temperature of the leaving vapors or bulb 17.

Chamber 21 lies on the side of the diaphragm opposite to chamber 19. This chamber 21 is vented through tube 22 to the evaporator at the last turn or outlet pipe 36 so as to have the same pressure as the boiling refrigerant and consequently the outgoing gases. This pressure in chamber 21 then is a function of the temperature of the boiling liquid refrigerant in the evaporator, and it is that pressure exerted by this refrigerant at this saturation temperature. Hence the underside of the diaphragm 20 is subjected to the pressure of the boiling refrigerant in the evaporator; consequently this liquid is at the lowest pressure of any liquid in the evaporator. Note that in a bottom feed evaporator as shown the pressure of the inlet to the evaporator is the highest and consequently the liquid at this point is at the highest temperature. The top of the diaphragm is subjected to the pressure of chamber 19 a function of the temperature of the leaving vapors. This would be the same as that of chamber 21 were there no superheat in the leaving vapors, since the temperature of the fluid 17 would be the same as the refrigerant in the evaporator and consequently it would exert the same pressure. Note the spring 37 exerts practically a constant force tending to keep the valve closed. This is particularily true in the closed position. However the farther the valve opens the greater the spring force becomes and the greater the opposing pressure must be. This accounts for the increase required in the superheat for the full open position over the just open position. This spring is calibrated to open the full amount of valve movement for a given amount of superheat. The preferred range for this application is about 4 degrees Fahrenheit temperature difference for the complete range of open to closed position.

Valve 23 engages seat 24 and co-operates with the seat to control the flow of liquid refrigerant from T 9 into chamber 25 of the pilot valve. The pressure in chamber 19 tends to open the valve 23, while the pressure in chamber 21 tends to close the valve. Note the packing gland 26 and the gland nut 27 separating chamber 25 from chamber 21. Tube 28 conducts the liquid refrigerant out of chamber 25. Note that the liquid in chamber 25 can be at high pressure and not directly affect the diaphragm 20 at all; that is, the liquid head and velocity head of refrigerant sent into the evaporator does not affect the diaphragm. Therefore the velocity head and liquid head at the entrance to the evaporator do not have any effect upon the action of the valve or influence the superheat sensitivity of the pilot valve. They do not add into the superheat sensitivity as they would were packing gland 26 omitted.

The liquid refrigerant discharged from the pilot valve 10 enters the main metering valve assembly 11 through tube 28 and inlet port 29 to chamber 30 ahead of the piston 31. The refrigerant released into chamber 30 after overcoming the initial load of spring 33, forces the piston 31 to move along cylinder 32 thus lifting valve 12 off the seat 13 releasing liquid refrigerant into chamber 14. Note that the travel of the main valve 12 is limited only by the length of cylinder 32. As soon as the demand for liquid refrigerant is satisfied, valve 23 of the pilot valve closes onto seat 24 stopping the flow of refrigerant into chamber 30. Spring 33 acting through its retainer 34 tends to close the valve and press the piston 31 back to its closed position. The liquid in chamber 30 ahead of the piston escapes through controlled orifice 35 into chamber 14 and the evaporator. Orifice 35 has a valve 41 which can be turned toward or away from its seat thereby closing or opening the passage between chamber 30 and chamber 14 through drilled hole 42. Valve 41 has packing gland 43 to prevent escape of the refrigerant past the valve stem.

This adjustable orifice makes it possible to balance the discharge of the pilot valve to cause the desired travel in the auxiliary valve. By this means, the controllable orifice 35 regulates the relation between the travel of the pilot valve and the travel of the main valve 12. By this device control is had over variable combinations of pilot valve size to main valve size or the size or load on evaporator and the operating temperature level of the evaporator.

As shown the evaporator depends upon the action of valve 23 for its supply of liquid refrigerant. The evaporator can get liquid refrigerant only when valve 23 is open thereby opening the main valve 12. In order to prevent liquid refrigerant from passing over into the compressor it will be sufficient if all refrigerant passing through tube 36 is superheated. As has been shown pressures in chambers 21 and 19 are the same when the refrigerant passing through tube 36 is just saturated. Spring 37 however exerts a force against the diaphragm 20 tending to close the valve. This force acts in the same direction as the vapor in chamber 21. To lift the valve 23 off the seat it becomes necessary for the vapor in chamber 19 to exert pressure in excess of the pressure of the lower chamber 21 by the amount of the spring pressure. Since the pressure of the fluid in 19 must be greater than that in 21 it follows that the temperature of the liquid 17 must be warmer than the boiling liquid in the evaporator since these fluids have the same pressure temperature characteristics. Therefore since the temperature of liquid 17 is the same as the outgoing vapors, these vapors must be at a higher temperature than the boiling liquid in the evaporator; that is, these vapors must be superheated and valve 23 is closed, remains closed and will not open until the proper degree of superheat is attained by the leaving vapors. Hence a temperature differential must exist between the boiling liquid and the leaving vapors before valve 23 and consequently valve 12 can open. Due to the definite load of spring 37 the valve 23 cannot open before a correspondingly definite pressure differential exists between chambers 19 and 21. Within a considerable range of evaporator temperatures this definite pressure differential corresponds to a reasonably constant difference or superheat. The superheat is fairly constant regardless of the actual momentary evaporator temperature. Note also since the opening point is a function of pressure differential balanced by the spring 37 it is also true that the wide open point must fall on some spring load greater than the opening or cracking point. This spring in practice is calibrated to permit the valve 23 to open at say 4 degrees of superheat and to become wide open at an additional 4 degrees of superheat. This then becomes the operating superheat range of the valve; that is, the valve is closed for all pressures corresponding to 4 degrees of superheat and wide open above pressure differentials corresponding to 8 degrees superheat. As shown the pressure in chamber 21 is a function of the boiling point temperature in the evaporator while the pressure in chamber 19 is a function of the temperature of the vapors leaving the evaporator for the compressor. Hence the valve 12 is open only when the temperature of the leaving vapors exceeds that of the boiling refrigerant by a definite amount and is closed for all lesser amounts. The valve 23 therefore opens or closes according to the amount of superheat (temperature differential above the "just saturated point") present in the leaving vapors. This valve combination operates on a reasonably constant temperature differential regardless of the particular temperature level at which it happens to be working. It is well known that variable load conditions cause temperature variations in the evaporator. The temperature could be say 45 degrees Fahrenheit for an evaporator cooling a warm liquid and if the incoming liquid were admitted more slowly or if its temperature were lowered, the evaporator temperature could easily lower many degrees, let us say 20. This would not in the least alter the operation of the valve combination since the valve 23 would still lift off its seat by precisely the same pressure differential between chambers 21 and 19 as before.

Low superheat in the leaving vapors is most desirable. In fact the narrower this temperature differential can be held the more efficient the system becomes. Heretofore differentials of less than 10 degrees Fahrenheit have been impractical because of liquid refrigerant carrying over into the compressor. In the past one of the chief reasons for this comparatively wide differential has been the variable head pressure of the refrigerant within the evaporator itself. Changes in velocity and temperature of the surrounding media have a tremendous effect on the rate of evaporation within the boiler. The quality or ratio of liquid to vapor is affected by this boiling rate. The density is lowered in proportion to the decrease of liquid in a unit volume of fluid refrigerant.

Taking "Freon" in the neighborhood of 46 degrees Fahrenheit one degree of temperature change corresponds to about one pound per square inch of pressure change. Hence in an evaporator two feet high the head can change a whole pound per square inch or one degree Fahrenheit due entirely to the rate at which evaporation is going on. For larger evaporators the head can change proportionately. However by connecting chamber 21 to the outlet pipe 36 through tube 22, the pressure under the diaphragm is that corresponding to the pressure of the leaving vapors, or the vapor pressure corresponding to the lowest temperature existing in the evaporator. Hence it can readily be seen that in any valve or valve combination where the pressure under the diaphragm tending to close the valve is sensitive to the head at the inlet to the evaporator, precise and uniform low superheats cannot be had because of the variable densities of fluid that upsets the equilibrium of forces acting upon the diaphragm 20.

Further the velocity imparted to the refrigerant fluid on discharge from chamber 25 into tube 28 requires a force to produce it. This force is called the "velocity head" in hydraulics. This velocity head originates in chamber 25, and were chamber 21 directly connected to it as is the ordinary practice the control surface 20 would be subjected to this head and the valve 23 then would also be forced to respond to it. Then the temperature differential would be affected by just the amount of this velocity head. This velocity head tends to close the valve. The head of refrigerant acts similarly, tending to close the valve for positive values of head (head above the orifice) and tending to open the valve for negative values of head (head below the orifice), the latter occurring in a top feed evaporator and the former in a bottom feed evaporator. The refrigerant head is further modified by the variations in density or the quality of the refrigerant fluid in the evaporator.

Also since the high pressure refrigerant discharged past seat 24 and the valve 23 into chamber 25 is conducted to chamber 30 and throttled at the orifice 35 in order to compress spring 33 and open the valve 12, chambers 30, 25 and tube 28 are pressurized considerably above the pressure of the evaporator. It is also imperative that this pressure intermediate between the liquid line pressure and the pressure of the refrigerant leaving the evaporator be not allowed to affect the control surface 20. The means here used to avoid the reaction of the various undesirable heads upon the control surface 20 is of course the packing gland 26, the nut 27 and the vent tube 22 venting the chamber 21 to the last pass 36 of the evaporator. The undesirable heads thus avoided are: the variable density heads of refrigerant fluid in the evaporator, the velocity head imparted to the refrigerant on leaving valve 10, and the head required to pressurize chamber 30 and actuate valve 12. Thus it is seen that chamber 21 is subject to the static head only or vapor pressure of the refrigerant. This is also the lowest pressure in the evaporator and corresponds to the lowest temperature in the evaporator.

I claim:

1. In a refrigeration system including an evaporator, means for metering refrigerant into said evaporator and a charge of refrigerant in the system, said metering means comprising main and pilot valve means, said pilot valve having means responsive to the vapor pressure, therefore temperature, of the vaporizing refrigerant liquid in the evaporator tending to close the valve, and means responsive to temperature of the vapors leaving the evaporator tending to open the valve, and constant value pressure means tending to close the valve whereby a constant temperature differential is required to open the pilot valve, and said main valve means having main valve and seat means, pressure responsive means for actuating said main valve, means for transmitting refrigerant pressure from said pilot valve to said main valve pressure responsive means and means for bleeding said refrigerant from said main valve pressure responsive means into said evaporator, and means for varying the rate of discharge of said bleed means so as to control the discharge rate characteristics of said main valve.

2. In a compression type of refrigeration system having an evaporator and refrigerant fluid, refrigerant metering means including main metering means and pilot valve assembly means, said pilot valve assembly means having a valve and seat and means responsive to pressure therefore temperature of the vaporizing refrigerant fluid in the evaporator tending to close the valve, means responsive to temperature of the vapors leaving the evaporator tending to open the valve and means independent of evaporator conditions having a constant load setting tending to close the valve whereby the valve of the pilot assembly opens after a fixed temperature differential is established between vaporizing refrigerant and the leaving vapors; main metering means having a valve and seat, means responsive to pressure adapted to open the main metering valve, resilient means tending to close the main metering valve against its seat, means for conveying refrigerant fluid from the pilot valve assembly to the pressure responsive means of the main metering means whereby said main metering means meters refrigerant fluid into the evaporator of the refrigerating system in constant sympathy with and under the control of said pilot valve assembly means.

3. In a compression refrigeration system having an evaporator with inlet and outlet tubes, a charge of refrigerant fluid, a metering valve arrangement comprising a main metering valve assembly and a pilot thermal valve assembly, said pilot assembly having inlet and outlet ports, a valve and a seat controlling the flow of refrigerant fluid from inlet to outlet ports, a flexible pressure sensitive member for controlling the valve against its seat, a housing covering the member and sealed thereto, feeler tubing having one end opening into the housing and sealed into said housing and the other end of said tubing sealed shut and forming with the housing and member a hermetically sealed chamber, the sealed end of the feeler tubing being in thermal contact with the outlet tube of the evaporator, thermal fluid having similar vapor pressure characteristics to the refrigerant fluid filling the said hermetically sealed chamber and exerting a pressure which is a function of the temperature of the vapors passing through the outlet tube of the evaporator, said pressure exerted upon the flexible member tending to open the valve, a lower housing under the flexible member and sealed thereto, said housing including the walls of the pilot valve and forming a lower pressure chamber, a connecting tube having one end opening into this lower chamber and sealed to it and the other end sealed into and opening into the evaporator near the outlet whereby refrigerant from the evaporator is allowed to exert its pressure upon the lower side of the pressure sensitive member opposing the thermal fluid pressure and tending to close the valve, a loaded spring connected so as to tend to close the valve whereby the valve of said thermal pilot valve assembly remains closed on its seat so long as the pressure above the member is less than the evaporator vapor pressure under the member plus the spring load whereby said pilot assembly opens to allow the passage of refrigerant fluid only when pressure in the upper chamber overcomes the pressure in the lower which difference of pressures is a function of the vapor pressures of two similar fluids, consequently the valve opens on a temperature difference between vapor at the surface of the liquid refrigerant in the evaporator and the vapor passing out through the evaporator outlet tube; and a main metering valve assembly having inlet and outlet ports, a valve and seat, a spring tending to hold the valve on its seat, a cylinder with a head and a piston therein arranged to move the valve off the seat allowing the passage of refrigerant fluid, through tubing connecting the outlet port of the pilot assembly to the head of the metering assembly cylinder whereby refrigerant fluid discharged from the pilot assembly acting upon the piston of the main valve assembly opens the valve of the latter allowing refrigerant to enter the evaporator according to the dictates of the pilot valve.

4. In a refrigeration system including an evaporator, means for metering the refrigerant into the evaporator, a charge of refrigerant in the system, said metering means comprising main metering means including main valve and seat means, pressure actuated means for operating the main valve, means exerting a constant force tending to hold said main valve closed and on opening said force means increasing at a constant rate to the full open position of the main valve, orifice means adjacent said main metering means for spilling operating fluid into the evaporator; pilot valve mechanism having pilot valve and seat means, means responsive to temperature of the vapor leaving the evaporator tending to open the pilot valve, means responsive to the vaporizing refrigerant tending to close the pilot valve, constant force means tending to hold the pilot valve closed, on opening of said pilot valve the force increases at a constant rate to end of pilot valve travel and means for adjusting said orifice means whereby the opening travel of the main valve is regulated relative to the pilot valve travel.

5. In a refrigeration system including an evaporator, means for metering refrigerant into the evaporator, a charge of refrigerant in the system, said metering means comprising a main metering means and a pilot valve assembly, said main metering means having a main valve and seat and means using refrigerant fluid for controlling the motion of said main valve on said seat, said pilot valve assembly having a pilot valve and seat for controlling refrigerant flow therethrough, said pilot assembly including pressure operated means proportional to temperature of vapor leaving the evaporator tending to open the valve, also means proportional to refrigerant pressure within the evaporator tending to close the pilot valve, and also auxiliary force means such as a spring assisting evaporator pressure oppose the opening force with a constant value load whereby the pilot valve opens only on a minimum value of superheat in the vapors leaving the evaporator and which pilot valve opening permits refrigerant flow to said refrigerant fluid control means to open the main metering valve in sympathy with said pilot valve assembly.

6. In a compression refrigeration system having an evaporator, a charge of refrigerant in said system, means for metering refrigerant into said evaporator, said metering means comprising a main metering means having a main valve and seat, and a pilot valve assembly with a pilot valve and seat for controlling said main valve, means for transmitting refrigerant fluid from the pilot valve assembly to the main metering means, in said pilot valve assembly means responsive to temperature of the vapor leaving the evaporator tending to open the pilot valve and means responsive to evaporator pressure tending to close the pilot valve, means as a spring applying a constant load pressing the pilot valve shut which constant additional closing force demands additional temperature of the leaving vapors over the vaporizing liquid in the evaporator to open the pilot valve which opening biases the main valve open permitting refrigerant flow into the evaporator.

7. In a refrigeration system including an evaporator, a charge of refrigerant in the system, means for metering refrigerant into said evaporator, said metering means comprising a main metering means having a main valve and seat, a spring to urge said main valve against said seat and a piston to move the valve off the seat, a chamber over the piston and a pilot valve assembly having a pilot valve and seat, said assembly having means responsive to the temperature of the vapor leaving the evaporator tending to open the pilot valve, means responsive to vapor pressure of the liquid in the evaporator tending to close the pilot valve, means such as a spring for urging the pilot valve against its seat and means for conveying refrigerant fluid out of said pilot assembly to the chamber above the piston of the main metering means whereby said main metering means is actuated in sympathy with said pilot valve assembly.

8. In a refrigeration system including an evaporator a charge of refrigerant in the system, means for metering refrigerant into said evaporator, said metering means comprising a main metering means and a pilot valve assembly having a pilot valve and seat, means responsive to the temperature of the vapor leaving the evaporator tending to open the valve, means responsive to the vapor pressure of the refrigerant liquid within the evaporator tending to close the valve, means as a spring for urging the pilot valve closed with a constant value load whereby the pilot valve is held closed for all superheats below a predetermined temperature; and a main metering means having a main valve and seat, means for conveying refrigerant from said pilot assembly to said main valve, pressure responsive means such as a piston whereby the main valve is actuated in sympathy with said pilot valve and means for adjusting the stroke of said main valve relative to the stroke of the pilot valve.

GEORGE E. SELDON.

REFERENCES CITED

The following references are of record in the file of this patent:

UNITED STATES PATENTS

| Number | Name | Date |
|---|---|---|
| 1,995,826 | Soderberg | Mar. 26, 1935 |
| 2,029,203 | Soderberg | Jan. 28, 1936 |
| 2,139,297 | Bergdoll | Dec. 6, 1938 |
| 2,220,998 | Holmes | Nov. 12, 1940 |
| 2,313,391 | Newton | Mar. 9, 1943 |
| 2,401,144 | Dube | May 28, 1946 |